(12) United States Patent
Pott

(10) Patent No.: US 7,504,144 B2
(45) Date of Patent: Mar. 17, 2009

(54) MULTILAYER TEXTILE REINFORCEMENT WEB

(76) Inventor: Richard Pott, Tannenbergerstrasse 33, Lage (DE) D-32791

( * ) Notice: Subject to any disclaimer, the term of this patent is extended or adjusted under 35 U.S.C. 154(b) by 542 days.

(21) Appl. No.: 10/898,818

(22) Filed: Jul. 26, 2004

(65) Prior Publication Data

US 2005/0020168 A1 Jan. 27, 2005

(30) Foreign Application Priority Data

Jul. 26, 2003 (DE) ................. 103 34 178

(51) Int. Cl.
*B32B 5/26* (2006.01)
*B32B 3/16* (2006.01)
*B32B 3/00* (2006.01)

(52) U.S. Cl. ................. 428/61; 428/55; 428/56; 428/57; 442/57

(58) Field of Classification Search ............ 428/61, 428/190, 55, 56
See application file for complete search history.

(56) References Cited

U.S. PATENT DOCUMENTS

| | | | | | |
|---|---|---|---|---|---|
| 3,772,746 | A | * | 11/1973 | Ivanowicz | 28/110 |
| 4,279,610 | A | * | 7/1981 | Reba | 493/411 |
| 5,202,170 | A | * | 4/1993 | Hsu et al. | 428/48 |
| 5,879,777 | A | * | 3/1999 | Shipley | 428/100 |
| 5,945,356 | A | | 8/1999 | Pott | |

* cited by examiner

*Primary Examiner*—Jeremy R. Pierce
(74) *Attorney, Agent, or Firm*—John P. McGonagle

(57) ABSTRACT

Multiple, single fiber webs, consisting of parallel fiber bundles and non-wovens connected by an adhesive thread grid, positioned on a common shaft for simultaneous unwinding. The single webs are dispensed under tension from a primary unwinding drum while, in the same process, an additional adhesive thread grid of non-woven or fiber mat is dispensed and, using tension winding, combined with the single webs into a homogeneous laminate.

5 Claims, 2 Drawing Sheets

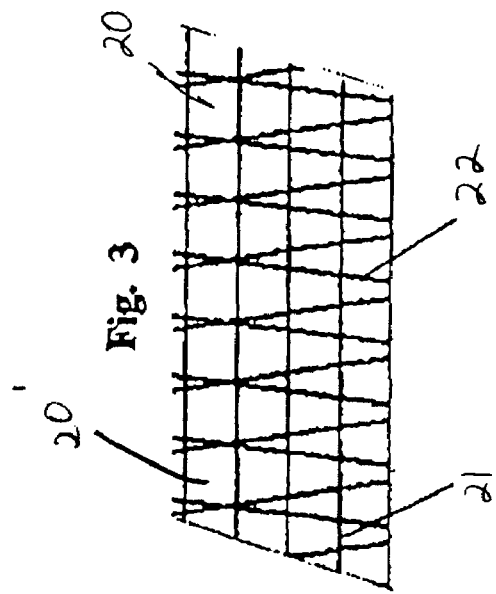
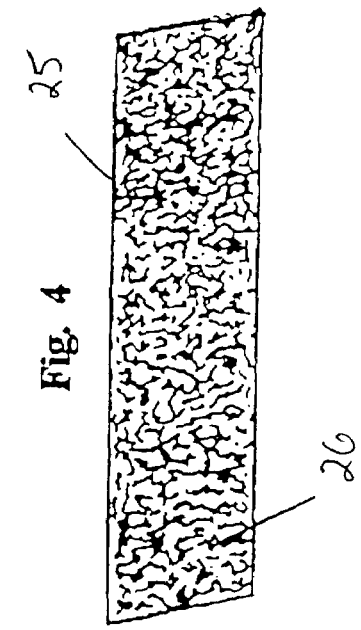
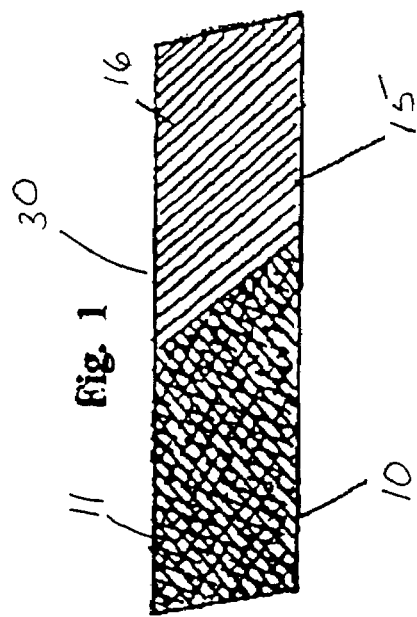
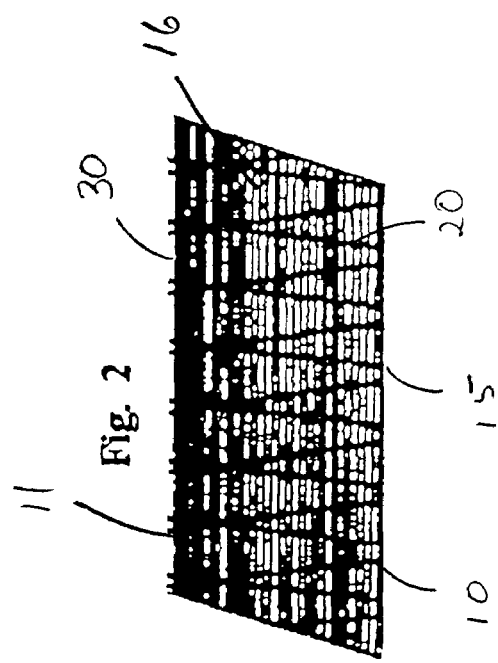

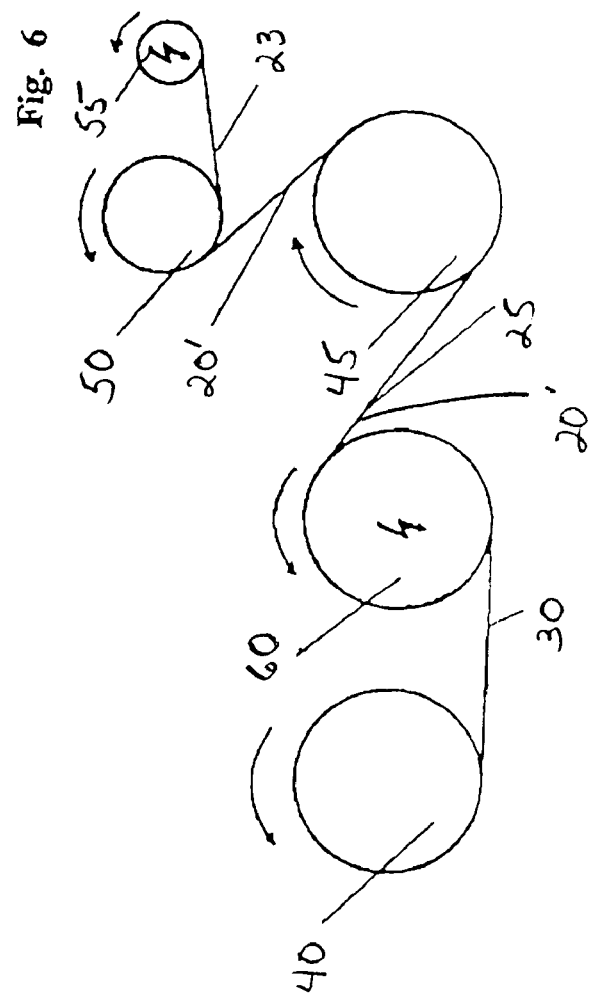
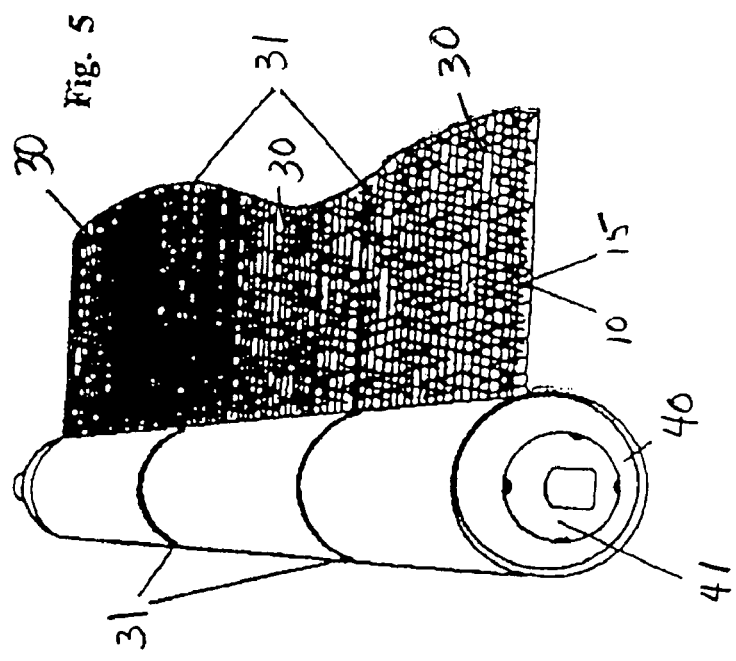

MULTILAYER TEXTILE REINFORCEMENT WEB

BACKGROUND OF THE INVENTION

This invention relates to reinforcing articles, and in particular to multilayer textile reinforcement webs.

Uni-directional and multi-directional textile webs have proven themselves particularly as outstanding reinforcements. Currently manufactured textile webs, comprised of parallel oriented fiber bundles, are available only in limited web widths. The possible applications are, however, limited when large parts must be fabricated (especially with the use of glass fibers) for example, in railcars, marine vessels, or in buildings, especially facades and roofs. The largest possible web widths are desired by web users, for example, in construction applications, in order to minimize costs and obtain maximum total strength over large surfaces without the use of butt joints.

The most significant drawbacks of limited reinforcement web width are: (i) the inevitable occurrence of gaps between adjacent webs that prevent a consistently strong connection, and (ii) the presence of large amounts of heavy, strength-reducing bonding (resin matrix) materials. To be sure, various reinforcement mats, e.g., non-woven fabrics, can achieve desired widths. However, tensile and breaking strength is very limited, making such mats usable only in large thicknesses. Only the addition of parallel oriented fibers makes possible high strength in such textile mats and the parts produced from these textile mats.

SUMMARY OF THE INVENTION

To accomplish the above purposes the present invention provides a multilayer textile reinforcement web made by parallel fiber bundles and non-woven fabrics connected by a grid of tacking threads.

Multilayer textile webs offer a broad spectrum of uses, characterized by extensive applications of synthetic fiber reinforced panels for walls, floors, balconies, roofing; as sandwich panels for curtain walls with natural or synthetic stone; as sealing panels for sub-surface construction; and as reinforcement for large concrete components with corroded steel reinforcement. Other applications include: large sewer pipes, water pipes, reinforced steam pipes, rotors and bases for wind-powered generators, marine hulls, superstructures and internal load bearing components, cargo containers, overhead cranes, railway cars and truck trailers incorporating sandwich construction with foam, balsa, or honeycomb cores, blast and ballistic protection in various mobile and stationery forms, and aerospace, automotive and other transportation related components. The present invention provides the following additional material features: corrosion and chemical resistant, reasonable pricing due to production process speed, easy laminate resin infusion through capillary action, lower weight due to minimum matrix resin requirement, high tension and compression strength due to parallel fiber orientation, and design freedom for designers.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 1 shows two portions of a single web with fiber strands arranged in parallel and in a ±45° fiber orientation.

FIG. 2 shows a single web with fiber strands arranged in parallel and in a 0° fiber orientation.

FIG. 3 shows an adhesive thread grid with longitudinal threads and transverse threads on top.

FIG. 4 shows a non-woven fabrics mat of non-oriented single filaments.

FIG. 5 shows adjacent edge to edge single webs on their respective drums positioned on a brake-assisted shaft.

FIG. 6 illustrates a production flow schematic in side view.

DETAILED DESCRIPTION OF THE INVENTION

Referring to the drawings in detail wherein like elements are indicated by like numerals, the purpose of the present invention is to overcome drawbacks that accrue from both limited web widths and limited web connection strength. To achieve this, two single webs 10, 15 are glued together. In other embodiments of the invention, more than two single webs may be used. FIG. 1 illustrates two single webs 10, 15 attached to each other, the first web 10 having fiber strands 11 in ±45° fiber orientations and the second web 15 having fiber strands 16 arranged in parallel. FIG. 2 illustrates two single webs 10, 15 having fiber strands 11, 16 arranged in parallel. The chosen single webs 10, 15 are then glued together with adhesive threads 20. As may be best seen in FIG. 3, an adhesive thread grid 20 with longitudinal threads 21 and transverse threads 22 may be used. The threads 21, 22 may be composed of glass, carbon, aramid, polyester, spun rayon and similar fibers. The single webs 10, 15, having fiber bundles in either uni-directional or multi-directional orientation, preferably in an alternating configuration, are joined with an adhesive grid 20 result in a multilayer, textile, reinforced web 30. The fiber strands 11, 16 may be composed of glass, aramid, carbon, polyester, polyethylene, polycarbonate, crystal, hemp, flax coconut, sisal, or similar fibers. The single webs 10, 15 may also use a woven fabric with weft and warp threads using fibers of similar materials instead of parallel oriented fiber bundles. Multiaxial stitchbonding fabric may also be used for the single webs 10, 15 instead of a woven fabric with weft and warp threads or parallel oriented fiber bundles.

Referring more particularly to FIG. 5, a plurality of reinforced webs 30 are wound on separate drums 40. The drums 40 are mounted collectively on a common uptake spool 41 such that the reinforced webs 30 are positioned gap-free, edge 31 to edge 31. In another embodiment of the invention, the edges 31 may be overlapped. Referring also to FIG. 4 and FIG. 6, a non-woven fabrics mat 25 of non-oriented single filaments 26 is provided on a mat supply drum 45. An adhesive thread grid 20' with safety and release film 23 is provided on an adhesive supply drum 50. A powered take-off roller 55 removes the safety and release films 23 that prevents the self-gluing of the adhesive-impregnated thread grid 20'. The adhesive grid 20' is combined with the mat 25 and joined with the several, side-by-side reinforced webs 30 on the uptake spool 60 in high tension, all being compressed together, resulting in a multilayer textile reinforcement web. The uptake spool 60 with multilayer textile reinforcement web may be moved to another machine for web removal.

The winding drums 40, 45 or the uptake spool 60 are equipped with brakes. The mat supply drum 45 and uptake spool 60 are heated. The adhesive supply drum 50 merges the adhesive grid 20' and the mat supply drum 45 with the non-woven fabrics mat 25. The operation results in a plurality of reinforced webs 30 being glued side-by-side, edge-to-edge to a common mat 25, with a resulting one-piece, reinforced web having a far greater width than found in the prior art.

It is understood that the above-described embodiment is merely illustrative of the application. Other embodiments may be readily devised by those skilled in the art which will embody the principles of the invention and fall within the spirit and scope thereof.

I claim:

1. A multilayer textile reinforcement web, comprising:
a plurality of reinforced webs having opposite surfaces and opposite side edges, each said reinforced web having a plurality of single webs, each said single web having a plurality of fiber strands;
wherein said plurality of reinforced webs are positioned side edge to side edge with adjacent reinforced webs, said reinforced webs having one surface attached to a common mat;
wherein said common mat is a non-woven fabrics mat of non-oriented single filaments;
wherein said single webs are joined together by adhesive threads.

2. A multilayer textile reinforcement web as recited in claim 1, wherein:
said adhesive threads are formed into an adhesive thread grid with a plurality of longitudinal threads and a plurality of transverse threads.

3. A multilayer textile reinforcement web as recited in claim 2, wherein:
said adhesive threads are chosen from a group comprised of glass, carbon, aramid, polyester, and spun rayon.

4. A multilayer textile reinforcement web, comprising:
a plurality of reinforced webs having opposite surfaces and opposite side edges, each said reinforced web having a plurality of single webs, each said single web having a plurality of fiber strands;
wherein said plurality of reinforced webs are positioned side edge to side edge with adjacent reinforced webs, said reinforced webs having one surface attached to a common mat;
wherein said common mat is a non-woven fabrics mat of non-oriented single filaments;
wherein said fiber strands are comprised of multiaxial stitchbonding fabric.

5. A multilayer textile reinforcement web, comprising:
a plurality of reinforced webs having opposite surfaces and opposite side edges, each said reinforced web having a plurality of single webs, each said single web having a plurality of fiber strands;
wherein said plurality of reinforced webs are positioned side edge to side edge with adjacent reinforced webs, said reinforced webs having one surface attached to a common mat;
wherein said common mat is a non-woven fabrics mat of non-oriented single filaments;
wherein said side edges are overlapped.

* * * * *